United States Patent
Chang et al.

(10) Patent No.: US 7,596,282 B2
(45) Date of Patent: Sep. 29, 2009

(54) SYSTEM AND METHOD FOR EFFICIENT FEATURE ESTIMATION FOR MEDICAL IMAGES

(75) Inventors: Ti-chiun Chang, Plainsboro, NJ (US); Jason Jenn-Kwei Tyan, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 655 days.

(21) Appl. No.: 11/343,128

(22) Filed: Jan. 30, 2006

(65) Prior Publication Data

US 2006/0171591 A1 Aug. 3, 2006

Related U.S. Application Data

(60) Provisional application No. 60/649,791, filed on Feb. 3, 2005.

(51) Int. Cl.
*G06K 9/64* (2006.01)
*G06K 9/40* (2006.01)

(52) U.S. Cl. ..................... 382/279; 382/260

(58) Field of Classification Search ............ 382/260, 382/261, 276, 279, 254, 190, 199, 205; 375/346, 375/350; 348/664–667
See application file for complete search history.

(56) References Cited

U.S. PATENT DOCUMENTS 5,694,474 A * 12/1997 Ngo et al. .................. 381/66
7,254,199 B1 * 8/2007 Desloge ..................... 375/350
2003/0041041 A1 2/2003 Cristianini
2006/0072844 A1 * 4/2006 Wang et al. ................ 382/254

OTHER PUBLICATIONS

Zhou J et al: "A robust algorithm for feature point matching" Computers and Graphics, Pergamon Press Ltd. Oxford, GB, vol. 26, No. 3, Jun. 2002, pp. 429-436, XP004366810 ISSN: 0097-8493 abstract p. 430, left-hand column, lines 28-44 paragraphs [002.], [03.1].

Vlassis N et al: "Learning task—relevant features from robot data" Proceedings of the 2001 IEEE International Conference on Robotics and Automation. ICRA 2001. Seoul, Korea, May 21-26, 2001, Proceedings of the IEEE International Conference on Robotics and Automation, New York, NY : IEEE, US, vol. vol. 1 of 4, May 21, 2001, pp. 499-504, XP010550 198 ISBN: 0-7803-6576-3 abstract paragraphs [0002], [03.3].

Klock H et al: "Data visualization by multidimensional scaling: a deterministic annealing approach" Pattern Recognition, Elsevier, Kidlington, GB, vol. 33, No. 4, Apr. 2000, pp. 651-669, XP004243860 ISSN: 0031-3203 abstract paragraphs [02.1], [03.2], [004.], [04.1], [04.2].

* cited by examiner

*Primary Examiner*—Yon Couso
(74) *Attorney, Agent, or Firm*—Donald B. Paschburg; F. Chau & Associates, LLC

(57) ABSTRACT

A method for estimating feature values from a digitized image includes calculating a gradient of an image, defining a filter weighting function, convolving the gradient with the filter weighting function, integrating over a subdomain of the convolved gradient to calculate components of a cost matrix Φ, wherein the cost matrix minimizes a distance metric in a frequency domain of the image, solving for the eigenvalues of the cost matrix, and calculating one or more features from the cost matrix eigenvalues. One or more predesigned bandpass filters can be applied to the image, and cost matrix eigenvalues are analyzed to select one or more appropriate bandpass filters to be applied to the image.

19 Claims, 3 Drawing Sheets

SYSTEM AND METHOD FOR EFFICIENT FEATURE ESTIMATION FOR MEDICAL IMAGES

CROSS REFERENCE TO RELATED UNITED STATES APPLICATIONS

This application claims priority from "Efficient Feature Estimation for Medical Image Processing", U.S. Provisional Application No. 60/649,791 of Chang, et al., filed Feb. 3, 2005, the contents of which are incorporated herein by reference.

TECHNICAL FIELD

This invention is directed to the local analysis of image structures in digital medical images.

DISCUSSION OF THE RELATED ART

Adaptive filtering in image processing refers to a self-adapting method which transforms the image intensity at each pixel to a new value by weighting and integrating the intensities of the pixels in a window according to the local structures. It is widely used in medical imaging modalities as a post processing module. In medical images, adaptive filtering is aimed at simultaneously mitigating noise resulting from image scanning devices along with enhancing important structures, such as edges, while satisfying at least the following criteria: (1) diagnostic patterns or structures contained in the image must be completely preserved; and (2) artifacts of any kind due to the filtering process are strictly prohibited, which thus avoids missing or creating any pathological information. However, due to noise variability in medical images, distinguishing structures from noise and analyzing local image structures are challenging problems.

A component common to any adaptive image filtering is analyzing the local intensity structure within a local window centered at each pixel in an image. This process is referred to as the feature estimation. For spectral analysis of a local image region, exemplary features include its phase, bandwidth, and magnitude information. In the spatial domain, these features can be interpreted as the structural orientation, isotropy, and energy for each pixel. To perform reliable feature estimation, there exists a computationally intensive method that uses three complex-valued quadrature prefilters, but this can involve up to six convolutions and becomes a speed bottleneck of any application that demands fast processing. In any case when these features are obtained, there exists many ways to adjust the image intensity and produce a satisfactory output. One way is to adopt the anisotropy diffusion algorithm to smooth a structure along its associated direction. Another way is to construct varying shapes of Gaussian kernels, which are used adaptively according to the feature maps. However, for the above methods, it is not clear how to enhance an image to satisfy different requirements.

SUMMARY OF THE INVENTION

Exemplary embodiments of the invention as described herein generally include methods and systems for efficient feature estimation which can be used in adaptive filtering algorithms. A feature estimation according to an embodiment of the invention is based on minimizing a distance metric in the frequency domain, and includes the following properties. A weighting function is incorporated in a distance metric formulated in the frequency domain. This can be interpreted as weighted average of gradients in the spatial domain and allows for flexible operations so that one can compute image gradients according to different signal to noise ratio of the original image. An additional feature, an energy map, is derived, which indicates the likelihood that each pixel is in a signal region (e.g. an important structure) or a noise region. The new feature can be used to enhance structures and/or edges in an image. This is useful in many applications. Based on these features, many enhancement techniques, such as unsharp masking or deformable filters can be employed. With the formulation according to an embodiment of the invention, an eigenvalue problem can be solved to obtain desirable features for each pixel. These include orientation, isotropy, and energy. After normalization and transformation by a predesigned function for the isotropy and energy maps, the new features can suitably guide a deformable filter set to achieve filtered outputs with very high quality. One example of the deformable filter kernel set includes a fixed lowpass component and feature-dependent bandpass/highpass components. Alternatively, these features can also have potential applications in optical flow and image registration. Experimental results of the adaptive filtering application show that the invented feature estimation is very computationally efficient and yields high-quality filtered outputs, which are comparable to those generated using more computationally intensive methods.

According to an aspect of the invention, there is provided a method for estimating feature values from a digitized image including the steps of providing a digitized image f(x) comprising a plurality of intensities corresponding to a domain of points on a n-dimensional grid, calculating a gradient of said image, defining a filter weighting function, convolving said gradient with said filter weighting function, integrating over a subdomain of said convolved gradient to calculate components of a cost matrix $\Phi$, wherein said cost matrix minimizes a distance metric in a frequency domain of said image, solving for the eigenvalues of said cost matrix, and calculating one or more features from said cost matrix eigenvalues.

According to a further aspect of the invention, the method comprises designing one or more bandpass filters to be applied to said image, and analyzing said cost matrix eigenvalues to select one or more appropriate bandpass filters to be applied to said image.

According to a further aspect of the invention, a component $\Phi_{ij}$ of said cost matrix is proportional to $$\int\int_R \left(\frac{\partial f(x)}{\partial x_i} \circ w(x)\right)\left(\frac{\partial f(x)}{\partial x_j} \circ w(x)\right) dx_i dx_j,$$

wherein $x=(x_1, x_2, \ldots, x_n)$ is a point vector representing the image grid, R is the n-dimensional domain over which the integration is performed, $$\frac{\partial f}{\partial x_i} \text{ and } \frac{\partial f}{\partial x_j}$$

represents components of the gradient of the image intensities, w(x) represents the filter weighting function, and the symbol $\circ$ represents convolution.

According to a further aspect of the invention, the method comprises calculating a signal direction $\theta(x)$ from said cost matrix by accumulating rotation angles $$\theta_{ij}(x) = \left\{ \frac{1}{2} \tan^{-1}\left(\frac{2\Phi_{ij}}{\Phi_{ii} - \Phi_{jj}}\right) \right\},$$

wherein $\theta_{ij}(x)$ denotes the rotation angle within the hyperplane that contains coordinate axes i and j, $\Phi_{ij}$, $\Phi_{ii}$, and $\Phi_{jj}$ are components of the cost matrix, and the angle accumulation is over all hyperplanes in a rotation matrix that diagonalizes said cost matrix.

According to a further aspect of the invention, the features include a signal anisotropy A(x) defined as $$A(x) = \left(\frac{\lambda_{max} - \lambda_{min}}{\lambda_{max} + \lambda_{min}}\right)^2,$$

wherein $\lambda_{max}$ and $\lambda_{min}$ are the maximum and minimum eigenvalues, respectively, of the cost matrix $\Phi$.

According to a further aspect of the invention, the features include a signal energy E(x) defined as $$E(x) = \sqrt{\sum_{i=1}^{n} \lambda_i^k},$$

wherein the $\lambda_i$ are the eigenvalues of the cost matrix $\Phi$, and k is a positive integer.

According to a further aspect of the invention, a sum of said lowpass and said one or more bandpass filters is substantially flat in the frequency domain, at least up to a high frequency cutoff.

According to a further aspect of the invention, the weighting function is proportional to $$\exp\left(-\frac{x \cdot x^T}{2\sigma}\right),$$

wherein x is a point in the image domain, and $\sigma$ is a predetermined constant based on the desired frequency spectrum of said weighting function.

According to another aspect of the invention, there is provided a program storage device readable by a computer, tangibly embodying a program of instructions executable by the computer to perform the method steps for estimating feature values from a digitized image.

DETAILED DESCRIPTION OF THE PREFERRED EMBODIMENTS

Figure 1:
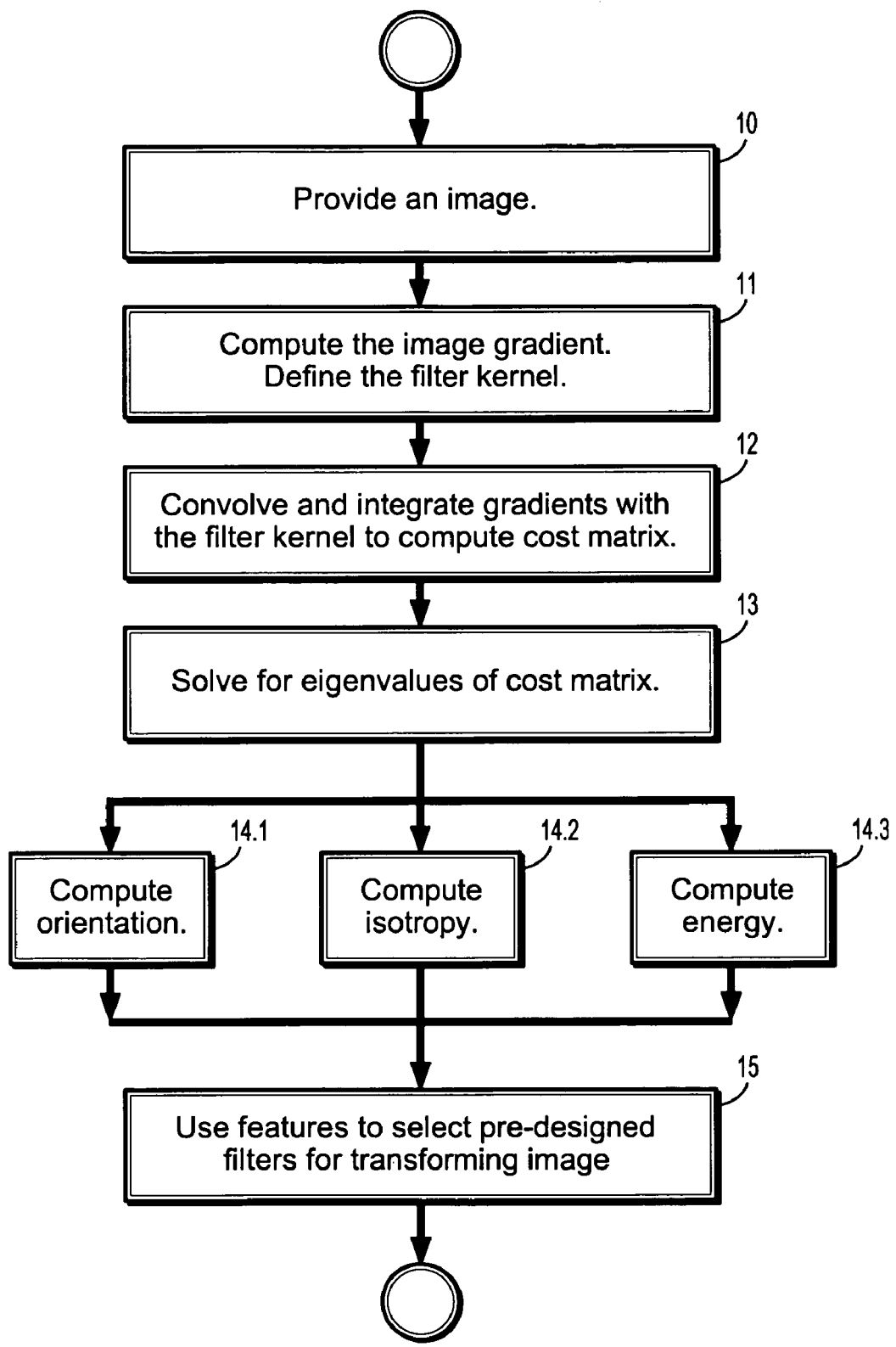
FIG. 1 depicts a flow chart of an exemplary feature estimation method according to an embodiment of the invention.
Figure 2A:
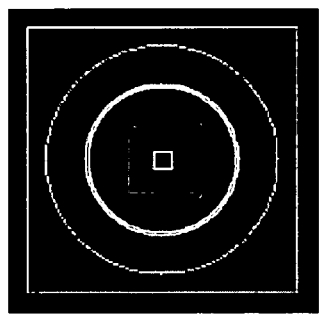
FIGS. 2(a)-(d) depict feature estimation experimental results, according to an embodiment of the invention.
Figure 2B:
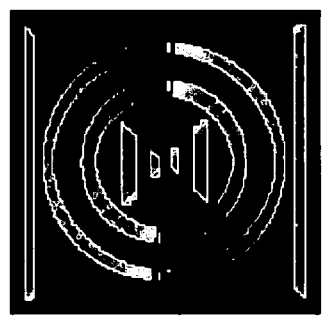
Figure 2C:
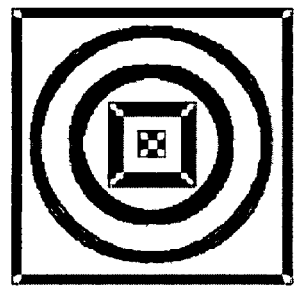
Figure 2D:
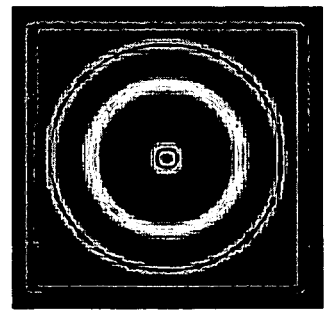

Exemplary embodiments of the invention as described herein generally include systems and methods for efficient feature estimation for adaptive filtering algorithms. However, specific structural and functional details disclosed herein are merely representative for purposes of describing example embodiments of the present invention. Further embodiments of the invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to $R$, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Rather than using a set of prefilters to convolve with the image and then estimate the desired features, to reduce computation complexity, a feature estimation method according to an embodiment of the invention is developed based on minimizing a distance metric in the frequency domain. The theory based on which a simple implementation can be employed will be described as follows. Let $f(x)$ and $F(u)$ denote, respectively, the input image and its Fourier transform. In a 2-D case note that $x=(x_1, x_2)$, and $u=(u_1, u_2)$. Note that the description in terms of a 2-D example is for illustrative purposes only, and it will be apparent to those skilled in the art how to extend the following exemplary description to an arbitrary number of dimensions. Within a local neighborhood centered at pixel x, if one assumes that the signal direction in the Fourier spectrum is denoted by s and the unit vector that is perpendicular to s is $s_p$, a cost function can be expressed as $$C(s_p) = \int\int W^2(u) d_p^2(u) |F(u)|^2 du,$$

where $$d_p^2(u) = (u \cdot s_p)^2 = (s_p^T u)(u^T s_p) = s_p^T (uu^T) s_p$$

is a real-valued function which gives the shortest Euclidean distance between a point u and a line that is perpendicular to $s_p$, $W(u)$ is a weighting function that can be designed a priori according to different applications, and T denotes matrix transpose. Note that in some exemplary embodiments, $W(u)$ can be one for all u. The above cost equation can be expanded to obtain $$C(s_p) = \int\int W^2(u) s_p^T (uu^T) s_p |F(u)|^2 du = s_p^T \Phi s_p,$$

where the cost matrix $\Phi$ is a real, symmetric, and positive semi-definite matrix, expressed as $$\Phi = \int\int W^2(u)(uu^T)|F(u)|^2 du.$$

In the exemplary 2-D example being described herein, $\Phi$ is a 2×2 matrix.

Applying Plancherel's theorem and the fact that differentiation in the spatial domain corresponds to multiplication by the respective coordinate in the frequency domain, the elements $\Phi_{ij}$ of $\Phi$ can be computed from the image gradients:

$$\Phi_{ij} = c \int\int_R \left(\frac{\partial f}{\partial x_i} \circ w\right)\left(\frac{\partial f}{\partial x_j} \circ w\right) dx_i dx_j,$$

where c is a constant scalar whose particular value is unimportant, R is the domain where the integration is performed, $w(x)$ represents the coefficients of the predesigned filter weighting kernel, and the symbol ∘ is used to denote convolution. In 2 dimensions, i, j=1, 2. The integration domain R is a small window about the pixel x, so that each cost matrix component is a function of the image domain. Typical size for R in 2-dimensions are 5×5 pixels or 7×7 pixels. The filter weighting kernel $w(x)$ can be set by the user, and is derived from the inverse Fourier transform of the weighting function $W(u)$ defined above. One exemplary, non-limiting kernel is represented by a Gaussian function $$w(x) = \exp\left(-\frac{x \cdot x^T}{2\sigma^2}\right),$$

with the sum of the filter coefficients $w(x)$ being normalized to 1. Other functions are possible depending on target results.

One is interested in solving for the eigenvalues of $\Phi$. One exemplary, non-limiting method for finding eigenvalues of an n×n matrix that is well known in the art is the Jacobi algorithm. Applying the Jacobi algorithm to the exemplary 2-D case being described, one can obtain the signal direction or orientation $$\theta(x) = \frac{1}{2}\tan^{-1}\left(\frac{2\Phi_{ij}}{\Phi_{ii} - \Phi_{jj}}\right).$$

In the n-dimensional case, a sequence of Jacobi rotation matrices is used in the algorithm to diagonalize $\Phi$ and to find the orientations of the eigenvectors. Each Jacobi rotation matrix contains 1's along the main diagonal, except for the two elements in rows and columns i and j; and all off-diagonal entries are zeros except for the ones at locations (i,j) and (j,i). For each application of the Jacobi matrix, the rotation angle within the hyperplane that contains coordinate axes i and j can be defined as $$\theta_{ij}(x) = \frac{1}{2}\tan^{-1}\left(\frac{2\Phi_{ij}}{\Phi_{ii} - \Phi_{jj}}\right).$$

The signal orientation is obtained after all the rotation procedures from an angle accumulation procedure, as is well known in the art.

In the n-dimensional case, a Jacobi rotation matrix used in the algorithm contains 1's along the diagonal, except for the two elements in rows and columns i and j, and the orientation can be defined as $$\theta(x) = \frac{1}{2}\tan^{-1}\left(\frac{2\Phi_{ij}}{\Phi_{ii} - \Phi_{jj}}\right).$$

Returning to the exemplary 2-D case, let $\lambda_1$ and $\lambda_2$ denote the larger and smaller eigenvalues of $\Phi$, respectively. The signal anisotropy $A(x)$ and signal energy $E(x)$ can be defined, respectively, as $$A(x) = \left(\frac{\lambda_1 - \lambda_2}{\lambda_1 + \lambda_2}\right)^2,$$

and $$E(x) = \sqrt{\lambda_1^k + \lambda_2^k},$$

where exemplary values for k are 1 and 2. Note, however, that an energy can be defined for arbitrary positive integer values of k and still be within the scope of an embodiment of the invention.

In the general n-D case, the signal anisotropy $A(x)$ can be defined in terms of the maximum and minimum eigenvalues as follows:

$$A(x) = \left(\frac{\lambda_{\max} - \lambda_{\min}}{\lambda_{\max} + \lambda_{\min}}\right)^2,$$

while the signal energy can be defined in terms of all of the eigenvalues:

$$E(x) = \sqrt{\sum_{i=1}^{n} \lambda_i^k}.$$

The isotropy measure can be denoted as $I(x)=1-A(x)$. Here, $\lambda_1$ can be considered as the strength along the direction in which the majority of the spectral energy is concentrated, and $\lambda_2$ represents the signal strength in the direction perpendicular to that of $\lambda_1$. If the anisotropy measure $A(x)$ is thought of as parameterizing an ellipse, then one can see that the elongation of the ellipse varies according to the values of $\lambda_1$ and $\lambda_2$. When $\lambda_1$ is much larger than $\lambda_2$, the numerator and denominator in the equation for computing $A(x)$ are close in value to each other, and this makes $A(x)$ close to 1, implying that the ellipse is very elongated (anisotropic). By similar argument, when $\lambda_1$ is close to $\lambda_2$, $A(x)$ is close to 0, implying that the ellipse is very close to a circle (isotropic).

The energy $E(x)$ indicates the likelihood that each pixel is in a signal region (e.g. an important structure) or a noise region. If the eigenvalues of both principal axes are large, the energy $E(x)$ will also be large. In this case, the probability that the current pixel x represents a strong signal is high, a filter can be used to emphasize the high frequency band to enhance the pixel. Typically, a filter that emphasizes the mid- and/or high-frequency band can be used. On the contrary, if the energy $E(x)$ is small, the current pixel x will be considered to be noise, and a lowpass filter will be used to smooth it.

FIG. 1 depicts a flow chart of an exemplary feature estimation method according to an embodiment of the invention. Starting at step 10, an input image $f(x)$ is provided.

At step 11, the image gradient $$\nabla f(x) = \left(\frac{\partial f}{\partial x_1}, \dots, \frac{\partial f}{\partial x_n}\right),$$

is computed and the filter kernel weighting function $w(x)$ is defined. These gradient components are convolved with the filter kernel and then integrated over a local region at step 12 to compute the components $\Phi_{ij}$ of the cost matrix as defined above, using $$\Phi_{ij} = c \int \int_R \left(\frac{\partial f}{\partial x_i} \circ w\right)\left(\frac{\partial f}{\partial x_j} \circ w\right) dx_i dx_j,$$

At step 13, the eigenvalues $\lambda_1, \dots, \lambda_n$ of $\Phi$ are computed, and these eigenvalues are used to define the orientation map at step 14.1, the isotropy map at step 14.2, and the energy map at step 14.3, using the formulae defined above, where the orientation, isotropy, and energy are defined as functions over the whole image domain. These features can be used to select appropriate pre-designed filters for adaptive filtering at step 15, where the filters can be used to derive a transformed image from the original image. By suppressing frequency bands associated with noise and emphasizing those frequency bands associated with structures of interest, the filtering transformation can produce an image that is easier to interpret for diagnostic purposes.

Each of the pre-designed filters can be created by adding a lowpass filter and a bandpass/highpass filter in one embodiment of the deformable filters. If there is no a priori information about the image to be filtered, the sum of the bandpass/highpass filter and the lowpass filter should be flat in the frequency domain, at least up to a high frequency cutoff. This will treat all spatial frequencies as equally important. Using the estimated energy $E(x)$ according to the embodiment of the invention, one can weight the bandpass filter with $E(x)$ and then add it to the lowpass filter. When $E(x)$ is greater than one, the bandpass filter is emphasized, implying that the current pixel x will be enhanced. When $E(x)$ is smaller than one, the bandpass is suppressed, implying that the current pixel x will be smoothed. This demonstrates the usefulness of the energy feature. Exemplary filters include a Gaussian for the lowpass filter, and an oriented difference of Gaussians for the bandpass filter. Another exemplary filter set uses as a lowpass filter the following function:

$$F_{LP}(u) = \begin{cases} \cos^2(\pi u/a) & u \leq a/2 \\ 0 & u > a/2 \end{cases}$$

and uses the following functions for the highpass filter:

$$F_{HP}(u) = \begin{cases} 1 - \cos^2(\pi u/a) & u \leq a/2, \\ 1 & a/2 < u \leq \pi - a/2, \\ \cos^2(\pi(u - \pi + a/2)/a) & \pi - a/2 < u \leq \pi. \end{cases}$$

Here, the constant a is chosen so that the filter is realizable on a window of a given size. For example, in a 15×15 grid window, a=1.8. This exemplary highpass filter also has an angular component when modulated by $(u \cdot s_p)^2$. The filter examples provided here are for illustrative purposes only, and any combination of filters whose sum is substantially constant in the frequency domain can be incorporated in an embodiment of the invention.

FIGS. 2(*a*)-(*d*) depict feature estimation experimental results, according to an embodiment of the invention. Using the test image shown in FIG. 2(*a*), the estimated angle $\theta(x)$, isotropy I(x), and energy E(x) maps are shown, respectively, in FIGS. 2(b), 2(c), and 2(d). The horizontal direction is considered as 0°, and the angle increases counterclockwise. In each image, the values of the feature are normalized so that the maximum value corresponds to a gray value of 255. Comparing FIGS. 2(a) and 2(b), one can see in FIG. 2(b) that the circles have values 0 at 0°, which gradually increase to a maximum of 255 when approaching 180°. In addition, the horizontal lines in the squares have values of 0, and the vertical lines have values close to 128, which corresponds to 90°. In FIG. 2(c), one can see that the low intensity circles and squares agree well with those in FIG. 2(a), and this implies that these structures should be considered to have small isotropy values, and oriented filter kernels will be applied to them to preserve their sharpness. In FIG. 2(d), one can also see that the circles and squares have high energy values. Thus, they are considered as important structures and will be directionally enhanced, rather than smoothed, in the subsequent filtering process.

Figure 3A:
FIGS. 3(a)-(c) depict results of adaptive filtering, according to an embodiment of the invention.
Figure 3B:
Figure 3C:

To show the effectiveness of a feature estimation according to an embodiment of the invention in the overall adaptive filtering process, one can use these features to guide a set of adaptive filter kernels which are applied to an ultrasound image. Each kernel includes a lowpass and a highpass filter, with the highpass component varying in directions and isotropies. Here, isotropy can be interpreted as the bandwidth of the filter. The highpass filter is weighted by the estimated energy and then integrated with the lowpass filter. A feature estimation method according to an embodiment of the invention is compared with one that uses a set of three complex-valued prefilters of size 15×15. FIGS. 3(a)-(c) shows the filtered output results obtained using the three prefilters and method according to an embodiment of the invention. FIG. 3(a) is the original ultrasound image, FIG. 3(b) depicts the filtered output obtained subbing the set of three complex valued filters, and FIG. 3(c) depicts the result obtained using a feature estimation method according to an embodiment of the invention. Comparing with the original image in FIG. 3(a), one can see that both FIGS. 3(b) and 3(c) smooth out speckle noise and enhance the structures, which appear to be brighter and more continuous. However, the image of FIG. 3(c) was obtained much more quickly than that of FIG. 3(b), as a feature estimation method according to an embodiment of the invention uses relatively few multiplications and additions as compared with the three complex-valued prefilter method.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 4:
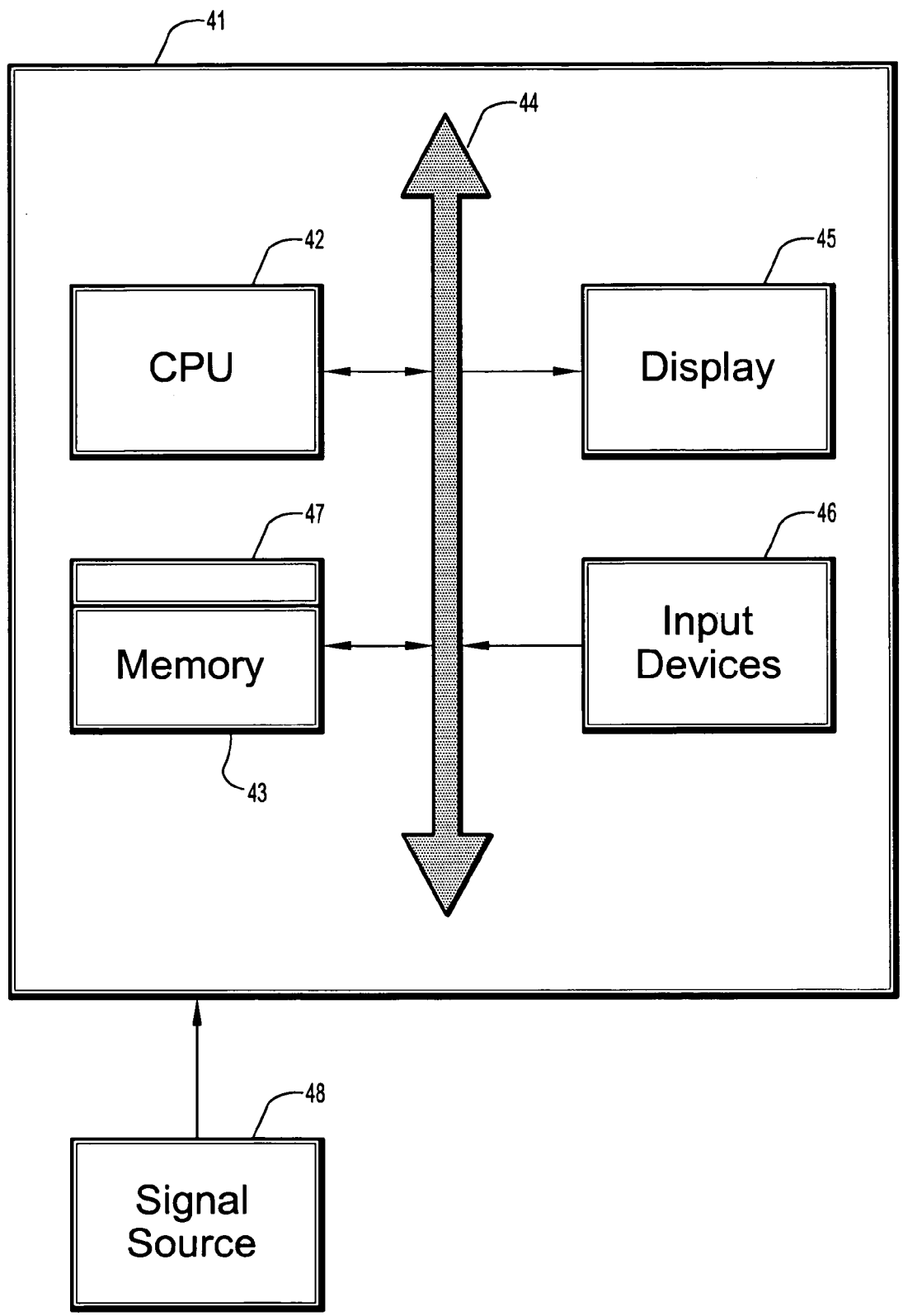
FIG. 4 is a block diagram of an exemplary computer system for implementing a method for feature estimation according to an embodiment of the invention.

FIG. 4 is a block diagram of an exemplary computer system for implementing a feature estimation method according to an embodiment of the invention. Referring now to FIG. 4, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the data from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for estimating feature values from a digitized image, comprising the steps of:

using a computer to perform the following steps of:

providing a digitized image f(x) comprising a plurality of intensities corresponding to a domain of points on a n-dimensional grid;

calculating a gradient of said image;

defining a filter weighting function;

convolving said gradient with said filter weighting function;

integrating over a subdomain of said convolved gradient to calculate components of a cost matrix $\Phi$, wherein said cost matrix minimizes a distance metric in a frequency domain of said image;

solving for the eigenvalues of said cost matrix; and calculating one or more features from said cost matrix eigenvalues.

2. The method of claim 1, further comprising designing one or more bandpass filters to be applied to said image; and analyzing said cost matrix eigenvalues to select one or more appropriate bandpass filters to be applied to said image.

3. The method of claim 1, wherein a component $\Phi_{ij}$ of said cost matrix is proportional to $$\int\int_R \left(\frac{\partial f(x)}{\partial x_i} \circ w(x)\right)\left(\frac{\partial f(x)}{\partial x_j} \circ w(x)\right) dx_i dx_j,$$

wherein $x=(x_1, x_2, \ldots, x_n)$ is a point vector representing the image grid, R is the n-dimensional domain over which the integration is performed, $$\frac{\partial f}{\partial x_i} \text{ and } \frac{\partial f}{\partial x_j}$$

represents components of the gradient of the image intensities, w(x) represents the filter weighting function, and the symbol ∘ represents convolution.

4. The method of claim 3, further comprising calculating a signal direction θ(x) from said cost matrix by accumulating rotation angles $$\theta_{ij}(x) = \left\{ \frac{1}{2}\tan^{-1}\left(\frac{2\Phi_{ij}}{\Phi_{ii} - \Phi_{jj}}\right) \right\},$$

wherein $\theta_{ij}(x)$ denotes the rotation angle within the hyperplane that contains coordinate axes i and j, $\Phi_{ij}$, $\Phi_{ii}$, and $\Phi_{jj}$ are components of the cost matrix, and the angle accumulation is over all hyperplanes in a rotation matrix that diagonalizes said cost matrix.

5. The method of claim 3, wherein said features include a signal anisotropy A(x) defined as $$A(x) = \left(\frac{\lambda_{max} - \lambda_{min}}{\lambda_{max} + \lambda_{min}}\right)^2,$$

wherein $\lambda_{max}$ and $\lambda_{min}$ are the maximum and minimum eigenvalues, respectively, of the cost matrix Φ.

6. The method of claim 3, wherein said features include a signal energy E(x) defined as $$E(x) = \sqrt{\sum_{i=1}^{n} \lambda_i^k},$$

wherein the $\lambda_i$ are the eigenvalues of the cost matrix Φ, and k is a positive integer.

7. The method of claim 2, wherein a sum of said lowpass and said one or more bandpass filters is substantially flat in the frequency domain, at least up to a high frequency cutoff.

8. The method of claim 1, wherein said weighting function is proportional to $$\exp\left(-\frac{x \cdot x^T}{2\sigma}\right),$$

wherein x is a point in the image domain, and σ is a predetermined constant based on the desired frequency spectrum of said weighting function.

9. A computer implemented method for estimating feature values from a digitized image, the method performed by the computer comprising the steps of:
providing a digitized image comprising a plurality of intensities corresponding to a domain of points on a n-dimensional grid;
convolving a gradient of said image;
integrating said convolved gradient over a subdomain of said image to calculate components of a cost matrix, wherein said cost matrix minimizes a distance metric in a frequency domain of said image;
solving for the eigenvalues of said cost matrix;
designing one or more bandpass filters to be applied to said image; and
analyzing said cost matrix eigenvalues to select one or more appropriate bandpass filters to be applied to said image.

10. The method of claim 9, further comprising calculating one or more features from said cost matrix eigenvalues.

11. The method of claim 9, further comprising defining a filter weighting function in said image domain, wherein said gradient is convolved with said filter weighting function.

12. A program storage device readable by a computer, tangibly embodying a program of instructions executable by the computer to perform the method steps for estimating feature values from a digitized image, said method comprising the steps of:
providing a digitized image f(x) comprising a plurality of intensities corresponding to a domain of points on a n-dimensional grid;
calculating a gradient of said image;
defining a filter weighting function;
convolving said gradient with said filter weighting function;
integrating over a subdomain of said convolved gradient to calculate components of a cost matrix Φ, wherein said cost matrix minimizes a distance metric in a frequency domain of said image;
solving for the eigenvalues of said cost matrix; and
calculating one or more features from said cost matrix eigenvalues.

13. The computer readable program storage device of claim 12, the method further comprising designing one or more bandpass filters to be applied to said image; and
analyzing said cost matrix eigenvalues to select one or more appropriate bandpass filters to be applied to said image.

14. The computer readable program storage device of claim 12, wherein a component $\Phi_{ij}$ of said cost matrix is proportional to $$\int\int_R \left(\frac{\partial f(x)}{\partial x_i} \circ w(x)\right)\left(\frac{\partial f(x)}{\partial x_j} \circ w(x)\right) dx_i dx_j,$$

wherein $x=(x_1, x_2, \ldots, x_n)$ is a point vector representing the image grid, R is the n-dimensional domain over which the integration is performed, $$\frac{\partial f}{\partial x_i} \text{ and } \frac{\partial f}{\partial x_j}$$

represents components of the gradient of the image intensities, w(x) represents the filter weighting function, and the symbol ∘ represents convolution.

15. The computer readable program storage device of claim 14, the method further comprising calculating a signal direction θ(x) from said cost matrix by accumulating rotation angles $$\theta_{ij}(x) = \left\{ \frac{1}{2} \tan^{-1}\left( \frac{2\Phi_{ij}}{\Phi_{ii} - \Phi_{jj}} \right) \right\},$$

wherein $\theta_{ij}(x)$ denotes the rotation angle within the hyperplane that contains coordinate axes i and j, $\Phi_{ij}$, $\Phi_{ii}$, and $\Phi_{jj}$ are components of the cost matrix, and the angle accumulation is over all hyperplanes in a rotation matrix that diagonalizes said cost matrix.

16. The computer readable program storage device of claim 14, wherein said features include a signal anisotropy A(x) defined as $$A(x) = \left( \frac{\lambda_{max} - \lambda_{min}}{\lambda_{max} + \lambda_{min}} \right)^2,$$

wherein $\lambda_{max}$ and $\lambda_{min}$ are the maximum and minimum eigenvalues, respectively, of the cost matrix Φ.

17. The computer readable program storage device of claim 14, wherein said features include a signal energy E(x) defined as $$E(x) = \sqrt{\sum_{i=1}^{n} \lambda_i^k},$$

wherein the $\lambda_i$ are the eigenvalues of the cost matrix Φ, and k is a positive integer.

18. The computer readable program storage device of claim 13, wherein a sum of said lowpass and said one or more bandpass filters is substantially flat in the frequency domain, at least up to a high frequency cutoff.

19. The computer readable program storage device of claim 12, wherein said weighting function is proportional to $$\exp\left( -\frac{x \cdot x^T}{2\sigma} \right),$$

wherein x is a point in the image domain, and σ is a predetermined constant based on the desired frequency spectrum of said weighting function.

* * * * *

UNITED STATES PATENT AND TRADEMARK OFFICE
CERTIFICATE OF CORRECTION

PATENT NO. : 7,596,282 B2 Page 1 of 1
APPLICATION NO. : 11/343128
DATED : September 29, 2009
INVENTOR(S) : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 897 days.

Signed and Sealed this

Twenty-eighth Day of September, 2010

David J. Kappos
*Director of the United States Patent and Trademark Office*